Patented Nov. 2, 1937

2,097,720

UNITED STATES PATENT OFFICE 2,097,720

TREATMENT OF OLIVE OIL TO PREVENT STEARIN COMING DOWN AT LOW TEMPERATURES

William Clayton, Sydney Back, James Frederick Morse, and Robert Ian Johnson, London, England, assignors to Crosse & Blackwell Limited, London, England, a British company No Drawing. Application January 15, 1937, Serial No. 120,823. In Great Britain January 18, 1936

6 Claims. (Cl. 87—12)

This invention relates to improvements in treatment of olive oil. A serious defect of olive oil is its tendency to deposit stearin at low temperatures. The presence of stearin is not really objectionable except for aesthetic reasons and considerable unnecessary expense is incurred if stearin is removed.

According to the invention the olive oil is treated with a small proportion, usually less than 1%, of an oxidized and polymerized glyceride of polar properties, preferably obtained by the oxidation and polymerization of a monounsaturated disaturated glyceride such as oleodistearin or oleopalmitostearin. The preparation of such products is described in a copending application No. 120,822, filed 15th January, 1937.

This application describes the production of modified glycerides by oxidation and polymerization, for example by blowing cacao butter, heated to 250° C., with air.

Thus olive oil containing stearin is treated with 0.5% of a polymerized oxidized cacao butter

| | |
|---|---|
| Molecular weight | 1350 |
| Iodine value | 20 |
| Free fatty acid | 1.1% |
| Oxidized fatty acid | 14% |
| Acetyl value | 56 |

This addition prevents the separation of stearin for several months when stored at a temperature of two to five degrees C. The effect appears to be a kind of peptization.

Satisfactory results can also be obtained by using the completely polymerized oxidized product but as this is dark in colour and less soluble, only about 0.1% should be added.

It is desirable to oxidize and polymerize the cacao butter in an aluminium or other non-ferrous pan to reduce formation of colour.

The exact amount of modified glyceride to be added depends on the stearin content of the oil and on the proposed conditions of storage.

We may mention "premier jus" as another example of a suitable raw material, which may be similarly oxidized and then polymerized.

We declare that what we claim is:—

1. Process of treating olive oil containing stearin which consists in adding a small proportion of a polymerized oxidized mono-unsaturated disaturated glyceride.

2. Process of treating olive oil containing stearin which consists in adding a small proportion of polymerized oxidized cacao butter.

3. Process of treating olive oil containing materials which separate out at low temperatures which consists in peptizing the material to reduce such separation by addition of a small proportion of polymerized oxidized monounsaturated disaturated glyceride.

4. Olive oil containing stearin and a small proportion of a polymerized oxidized cacao butter having a molecular weight from 1150 to 1500 and an iodine value below 23.

5. Olive oil containing stearin and a small proportion of a polymerized oxidized mono-unsaturated disaturated glyceride having a molecular weight from 1150 to 1500 and an iodine value below 23.

6. Olive oil containing stearin and a small proportion of polymerized oxidized oleodistearin having a molecular weight from 1150 to 1500 and an iodine value below 23.

WILLIAM CLAYTON.
SYDNEY BACK.
JAMES FREDERICK MORSE.
ROBERT IAN JOHNSON.